(12) United States Patent
Eacmen, III et al.

(10) Patent No.: US 10,984,110 B2
(45) Date of Patent: Apr. 20, 2021

(54) EVALUATION OF SECURITY OF FIRMWARE (71) Applicant: ReFirm Labs, Inc., Fulton, MD (US)

(72) Inventors: Peter P Eacmen, III, Clarksville, MD (US); Terry J Dunlap, Jr., Olney, MD (US)

(73) Assignee: ReFirm Labs, Inc., Fulton, MD (US)

( * ) Notice: Subject to any disclaimer, the term of this patent is extended or adjusted under 35 U.S.C. 154(b) by 276 days.

(21) Appl. No.: 15/926,868

(22) Filed: Mar. 20, 2018

(65) Prior Publication Data
US 2019/0294801 A1 Sep. 26, 2019

(51) Int. Cl.
G06F 21/00 (2013.01)
G06F 21/57 (2013.01)
G06F 21/46 (2013.01)

(52) U.S. Cl.
CPC ............ G06F 21/577 (2013.01); G06F 21/46 (2013.01); *G06F 2221/033* (2013.01)

(58) Field of Classification Search
CPC ....... G01F 11/00; G01F 22/00; G01F 23/0076
See application file for complete search history.

(56) References Cited

U.S. PATENT DOCUMENTS

| 7,207,065 | B2 | 4/2007 | Chess et al. |
| 7,424,706 | B2 | 9/2008 | Ivanov et al. |
| 8,726,392 | B1 | 5/2014 | McCorkendale et al. |
| 9,069,967 | B2 | 6/2015 | Wysopal et al. |
| 9,230,099 | B1 | 1/2016 | McCorkendale et al. |
| 9,258,320 | B2 * | 2/2016 | Hayrynen ........... H04L 63/1416 |
| 9,645,800 | B2 | 5/2017 | Sheth |
| 9,672,355 | B2 * | 6/2017 | Titonis .................... G06F 21/56 |

(Continued)

FOREIGN PATENT DOCUMENTS

EP    2610776A2 A2    7/2013

OTHER PUBLICATIONS

Palavicini et al., "Towards Firmware Analysis of Industrial Internet of Things (IIoT) Applying Symbolic Analysis to IIoT Firmware Vetting," Proceedings of the 2nd International Conference on Internet of Things, Big Data and Security (IoTBDS), 2017, pp. 470-477.

(Continued)

*Primary Examiner* — Ghazal B Shehni
(74) *Attorney, Agent, or Firm* — Carr & Ferrell LLP (57) ABSTRACT

Provided are methods and systems for evaluating security of firmware. An example method may include acquiring a firmware image of firmware associated with at least one computing device. The method may include extracting at least one component of the firmware image. The method may include analyzing the component to detect at least one vulnerability of the firmware. The method may also include estimating, based on the at least one vulnerability, a security risk level of the firmware. The method may further include providing a report regarding the security risk level and the at least one vulnerability of the firmware. The analysis may include determining that the component matches a specific file or contains a specific string or a specific pattern. The analysis may include detection of a cryptographic key or password hash in the component and determining a level of weakness of the password hash.

20 Claims, 4 Drawing Sheets

(56) References Cited

U.S. PATENT DOCUMENTS

| | | |
|---|---|---|
| 9,824,223 B2 | 11/2017 | Pappas |
| 2013/0097706 A1 | 4/2013 | Titonis et al. |
| 2013/0347104 A1 | 12/2013 | Raber et al. |
| 2014/0150100 A1 | 5/2014 | Gupta et al. |
| 2016/0112437 A1 | 4/2016 | Churyumov |
| 2016/0180096 A1 | 6/2016 | Sharma et al. |
| 2016/0212159 A1 | 7/2016 | Gupta et al. |
| 2019/0294802 A1 | 9/2019 | Eacmen, III et al. |

OTHER PUBLICATIONS

Weerawardhana et al., "Automated Extractoin of Vulnerability Information for Home Computer Security," Lecture Notes in Computer Science (LNCS) 8930, Springer, 2015, pp. 356-366.

Eschweiler et al. "discovRE: Efficient Cross-Architecture Identification of Bugs in Binary Code," Network and Distributed System Security Symposium (NDSS), 2016, pp. 1-15.

\* cited by examiner

EVALUATION OF SECURITY OF FIRMWARE

TECHNICAL FIELD

This disclosure relates to computer security. More specifically, this disclosure relates to systems and methods for the evaluation of the security of firmware.

BACKGROUND

With the development of the Internet of Things (IoT) technology, the number of IoT devices being made and used is increasing. These IoT devices can communicate and interact with each other, as well as with external devices, via the Internet. Manufacturers of IoT devices often rely on open source or third parties to provide code for the firmware used by the IoT devices. However, IoT devices can be vulnerable to unauthorized access and can be used to stage attacks against other devices. Currently, there are no robust solutions for detecting and diagnosing the vulnerability of firmware for IoT devices.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to the technology for the evaluation of the security of firmware. Some embodiments of the present disclosure may allow for the prediction of vulnerabilities in the firmware of IoT devices, embedded devices, industrial controllers, and so forth.

According to one example embodiment of the present disclosure, a method for evaluating the security of firmware is provided. The method may include acquiring, by at least one server, a firmware image of firmware associated with at least one computing device. The method may further include extracting, by the at least one server, at least one component of the firmware image. The method may further include analyzing, by the at least one server, the at least one component to detect at least one vulnerability of the firmware. The method may further include estimating, by the at least one server and based on the at least one vulnerability of the firmware, a security risk level of the firmware. The method may further include providing, by the at least one server, a report regarding the security risk level and the at least one vulnerability of the firmware.

In some embodiments, the analyzing may include determining that the at least one component includes a predetermined file known to contain vulnerabilities. In certain embodiments, the analyzing may include translating the at least one component of a binary machine code into a text format. In further embodiments, the analyzing may include determining that the at least one component includes at least a specific string or a specific pattern. In further embodiments, the analyzing includes determining a presence of a private cryptographic key, public cryptographic key, or a symmetric key in the at least one component. In further embodiments, the analyzing involves determining that at least one component of the hardware image includes at least one password hash. The analyzing may further include determining a level of weakness of the at least one password hash.

In some embodiments, extracting the at least one component can involve at least one extracting scheme. The extracting scheme can be selected based on a type of at least one computing device and/or a manufacturer of the at least one computing device. In certain embodiments, the extraction of at least one component can be performed recursively. In further embodiments, the at least one vulnerability can be detected based on data stored in a database of known vulnerabilities for the firmware of the at least one computing device.

In certain embodiments, the method may further include storing, by the at least one server, the at least one component. The method may further include receiving, by the at least one server, an indication that the database of known vulnerabilities has been updated with at least one further vulnerability previously unreported. The method may further include re-analyzing the at least one component to detect the at least one further vulnerability of the firmware. The method may further include (if a previously unreported vulnerability is detected), sending a message to at least one user of the device associated with the firmware.

According to one example embodiment of the present disclosure, a system for evaluating of a security of firmware is provided. The system may include at least one processor and a memory storing processor-executable codes, wherein the at least one processor can be configured to implement the operations of the above-mentioned method for evaluation of a security of a firmware.

According to yet another example embodiment of the present disclosure, the operations of the above-mentioned method for evaluating of a security of firmware are stored on a machine-readable medium comprising instructions, which when implemented by one or more processors perform the recited operations.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXEMPLARY EMBODIMENTS

The technology disclosed herein is concerned with methods and systems for evaluating the security of firmware. Embodiments of the present disclosure may facilitate the detection of vulnerabilities of firmware of computing devices, such as but not limited to embedded devices, IoT devices, microcontrollers, industrial controllers, and so forth. Some embodiments of the present disclosure may proactively predict possible attacks on the computing devices over networks.

According to one example embodiment of the present disclosure, a method for evaluating the security of firmware is provided. The method may include acquiring, by at least one server, a firmware image of firmware associated with at least one computing device. The method may further include extracting, by the at least one server, at least one component of the firmware. The method may further include analyzing, by the at least one server, the at least one component of the firmware to detect at least one vulnerability of the firmware. The method may further include estimating, by the at least one server and based on the at least one vulnerability, a security risk level of the firmware. The method may further include providing, by the at least one server, a report regarding the security risk level and the at least one vulnerability of the firmware.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

Figure 1:
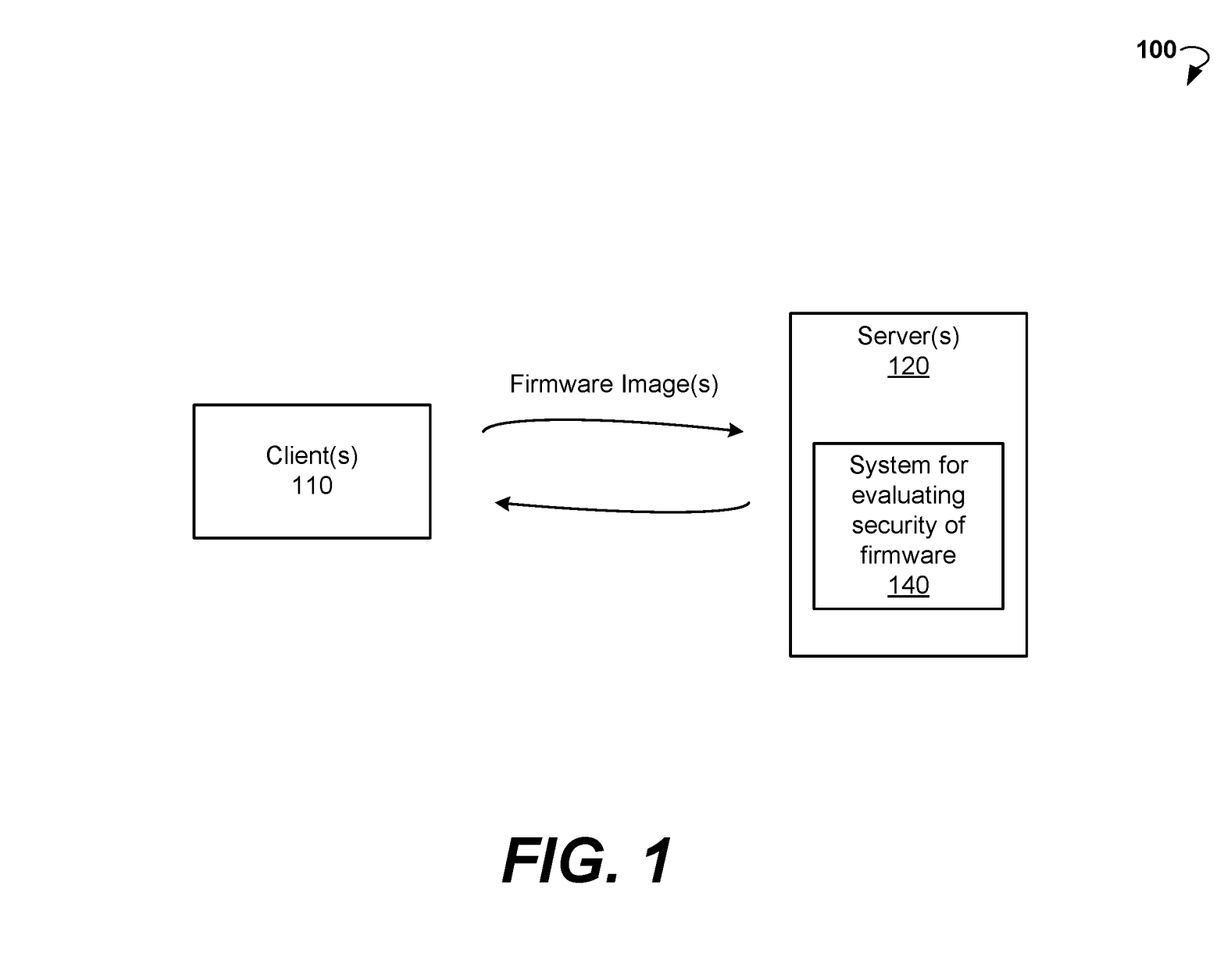
FIG. 1 is a block diagram of an example environment suitable for practicing methods for evaluating a security of firmware as described herein.

FIG. 1 shows a block diagram of an example environment 100 suitable for practicing the methods described herein. It should be noted, however, that the environment 100 is just one example and is a simplified embodiment provided for illustrative purposes, and reasonable deviations of this embodiment are possible as will be evident to those skilled in the art.

As shown in FIG. 1, the environment 100 may include at least one client device(s) 110 (also referred to as client(s) 110) and at least one server 120. In various embodiments, the client(s) 110 includes, but is not limited to, a laptop computer, a tablet computer, a desktop computer, and so forth. The client(s) 110 can include any appropriate device having network functionalities allowing the client(s) 110 to communicate to server(s) 120. In some embodiments, the client(s) 110 can be connected to the server(s) 120 via one or more wired or wireless communications networks.

In some embodiments, the server(s) 120 may include a standalone computing device. In some other embodiments, the server(s) 120 may be implemented as a cloud-based computing resource shared by multiple users. The cloud-based computing resource(s) can include hardware and software available at a remote location and accessible over a network (for example, the Internet). The cloud-based computing resource(s) can be dynamically re-allocated based on demand. The cloud-based computing resources may include one or more server farms/clusters including a collection of computer servers which can be co-located with network switches and/or routers.

In some embodiments, the server(s) 120 may be configured to run a system 140 for evaluating the security of firmware. A user of the client(s) 110 can upload a firmware image of a firmware associated with a specific computing device to the server(s) 120 via, for example, an Internet browser. In various embodiments, the firmware images may represent one or more of executables stored in a memory of the computing device. The executables may provide a low-level control for hardware of the specific computing device. The memory of the specific computing device may include read-only memory (ROM), erasable programmable read-only memory (EPROM), flash memory, and so forth. The specific computing devices may include but are not limited to a cellular phone, a smart phone, a gaming console, a multimedia system, a smart television device, a set-top box, an infotainment system, an in-vehicle computing device, and an informational kiosk. The firmware image can be associated with hardware used in various computer systems, computer peripherals, embedded devices, network routers, microcontrollers, consumer appliances, IoT devices, and so forth. The IoT devices may include, but are not limited to, sensors, actuators, thermostats, light bulbs, door locks, fridges, cars, implants, and so forth.

In some embodiments, prior to uploading the firmware image to server(s) 120, the user of client(s) 110 can read the firmware image from the memory of the specific computing device to the client(s) 110. In certain embodiments, the user may download the firmware image (for example an update for firmware for hardware) from a manufacturer's website to the client(s) 110.

In some embodiments, the user can further provide to server(s) 120 information regarding the computing device, vendor, version of firmware, and so forth. The server(s) 120 can be configured to provide the user an account for storing the user's profile and the firmware image(s) in a storage of the server(s) 120. In some embodiments, the system 140 can be configured to evaluate the firmware image for vulnerabilities upon user request and can present results of the evaluation via, for example, an Internet browser. In some embodiments, the evaluation can be performed based on a catalog of known issues with the firmware for computing devices. In certain embodiments, the system 140 can be configured to repeat the evaluation of the firmware images for vulnerabilities periodically or at time when the catalog of the known issues for this type of firmware is updated. If the evaluation results in a determination that the firmware image(s) include at least one previously unreported vulnerability, the system 140 can be configured to send a warning message to the user via e-mail, short message service, or one or more messengers.

Figure 2:
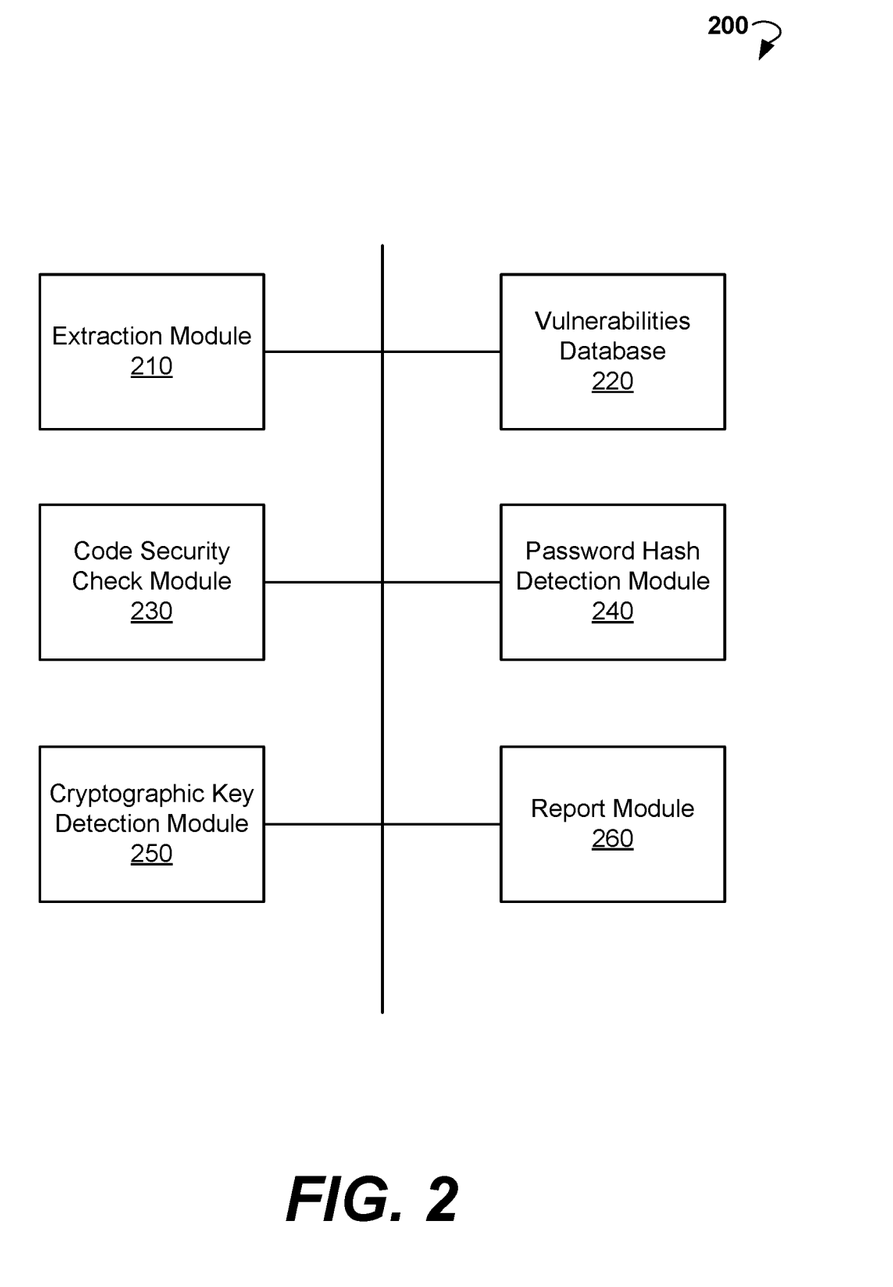
FIG. 2 is a block diagram shows an example system for evaluating a security of firmware, according to an example embodiment.

FIG. 2 is a block diagram 200 showing modules of the system 140 for evaluating the security of firmware, according to some example embodiments. The system 140 may include an extraction module 210, a vulnerabilities database 220, a code security check module 230, a password hash detection module 240, a cryptographic key detection module 250, and a report module 260. The modules of the scheme 200 can be implemented as software instructions stored in memory of the server(s) 120 and executed by at least one processor of the server 120.

In some embodiments, the extraction module 210 can be configured to extract components of a firmware from the firmware image(s). The extraction can be carried out using a pre-determined extraction scheme. The extraction scheme can be based on the information concerning a manufacturer, a type of the computing device or a type of hardware, and a version of the firmware. In some embodiments, the extraction of components can be performed recursively.

The extraction may include searching for specific signatures in the firmware image(s). The signatures can be indicative of the presence of one or more file containers in the firmware. Upon detection of the signatures, the one or more file containers can be extracted as components of the firmware. The result of the extraction may include a set of files and directories of files.

In some embodiments, the vulnerabilities database 220 may include a catalog of known vulnerabilities of firmware of computing devices. In some embodiments, the database 220 can be continuously updated with recently discovered issues concerning vulnerabilities of firmware.

In some embodiments, code security check module 230 can be configured to analyze the components of the firmware image to detect vulnerabilities. The security check module 230 can be configured to translate the components from a binary machine code into a readable text format. In some embodiments, the vulnerabilities can be detected based on the presence of a specific file in the translated readable text of the components, the presence of specific code line(s) in the translated readable text of one of the components, or the presence of a specific code pattern in the translated readable text of one of the component. The analysis can be performed based on information in vulnerabilities database 220. The analysis can be specific for each type of the computing device, version of the firmware, and manufacturer of the computing devices. In some embodiments, the analysis may include heuristic or statistical techniques for determining zero-day vulnerabilities.

In some embodiments, the password hash detection module 240 can be configured to analyze the components to detect the presence of a password hash hard-coded into the firmware image. Upon detection of the password hash, the module 240 can be further configured to determine a level of weakness of the password hash. In some embodiments, the module 240 can be configured to predict a time period within which the password hash will become weak.

In some embodiments, the cryptographic key detection module 250 can be configured to search for cryptographic material in the firmware image. The cryptographic material can be further analyzed to extract a public cryptographic key, private cryptographic key, or symmetric key.

In some embodiments, the report module 260 can be configured to collect results of the execution of the code security check module 230, the password hash detection module 240, and the cryptographic key detection module 250 and estimate a security risk level of the firmware image. The report module 260 can be further configured to display a report including the security risk level, number and type of vulnerabilities in executables, number of cryptographic keys, and number of password hashes and number of weak password hashes. In certain embodiments, the report module 260 can be configured to send a message concerning the report to a user of a device associated with the hardware image.

Figure 3:
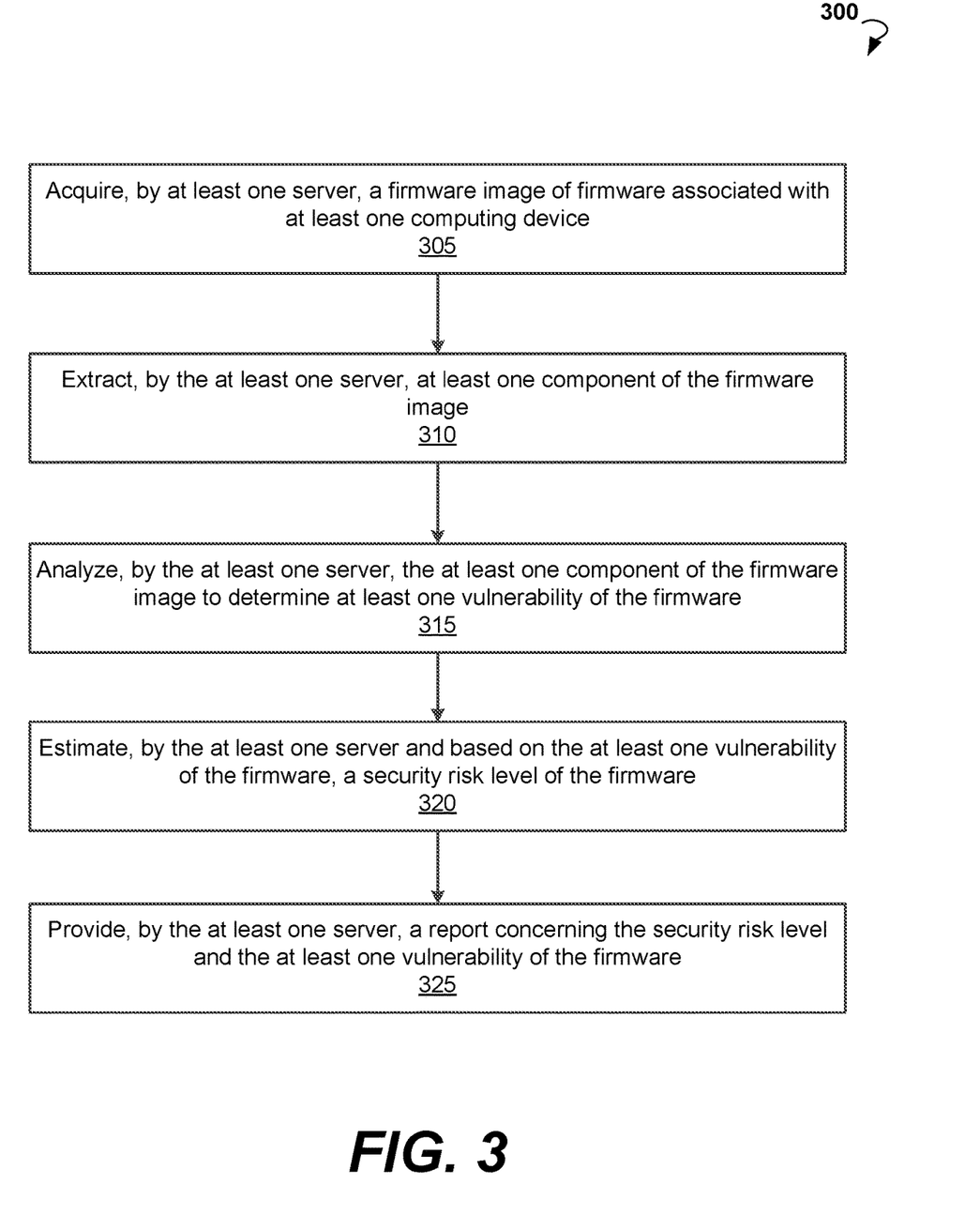
FIG. 3 is a flow chart of an example method for evaluating a security of firmware, according to some example embodiments.

FIG. 3 is a flow chart of an example method 300 for evaluating security of firmware, according to some example embodiments. The method 300 may be performed within the environment 100 illustrated in FIG. 1. Notably, the steps recited below may be implemented in an order different than described and shown in FIG. 3. Moreover, the method 300 may have additional steps not shown herein, but which can be evident to those skilled in the art from the present disclosure. The method 300 may also have fewer steps than outlined below and shown in FIG. 3.

In block 305, the method 300 may commence with acquiring, by at least one server, a firmware image of firmware associated with at least one computing device. In certain embodiments, the firmware image can be uploaded to the server by a user of the computing device. The user may also provide to the server information concerning a manufacturer of the computing device and a version of the firmware. In certain embodiments, the firmware image can be stored in a storage of the server to be periodically re-analyzed for vulnerabilities of the firmware.

In block 310, the method 300 may proceed with extracting, by the at least one server, at least one component of the firmware. The extraction can be based on a predetermined extraction scheme. The extraction scheme can be selected based on a type of the firmware, version of the firmware, and information for the manufacturer of the computing device and the firmware.

In block 315, the method 300 may proceed with analyzing, by the at least one server, the at least one component to detect at least one vulnerability of the firmware image. The analysis can be carried out by one or more analyzers. The analyzers can be developed and updated based on a type of firmware and version of the firmware, and information of the manufacturer of the computing device and the firmware. The analysis may include determining that the at least one component includes a specific file known to include vulnerabilities. The analysis may also include looking for a specific string or pattern in the at least one component. The analysis can be based on information obtained from a database of known vulnerabilities. In some embodiments, the analysis may include searching for private cryptographic keys left in the firmware image by a manufacturer. In certain embodiments, the analysis may also include searching for one or more password hashes in the at least one component and evaluating a level of weakness of the password hash.

In block 320, the method 300 may proceed with estimating, by the at least one server and based on the at least one vulnerability, a security risk level of the firmware image. The security risk level may be based on the number and type of vulnerabilities detected in the at least one component, the presence of a private cryptographic key in the at least one component and a number and level of weakness in the password hashes.

In block 325, the method 300 may proceed with providing, by the at least one server, a report regarding the security risk level and the at least one vulnerability of the firmware image. In certain embodiments, the report can be presented to a user of the firmware image via an Internet browser. In some embodiments, the report can be sent to the user of the firmware via e-mail or an instant messenger.

Figure 4:
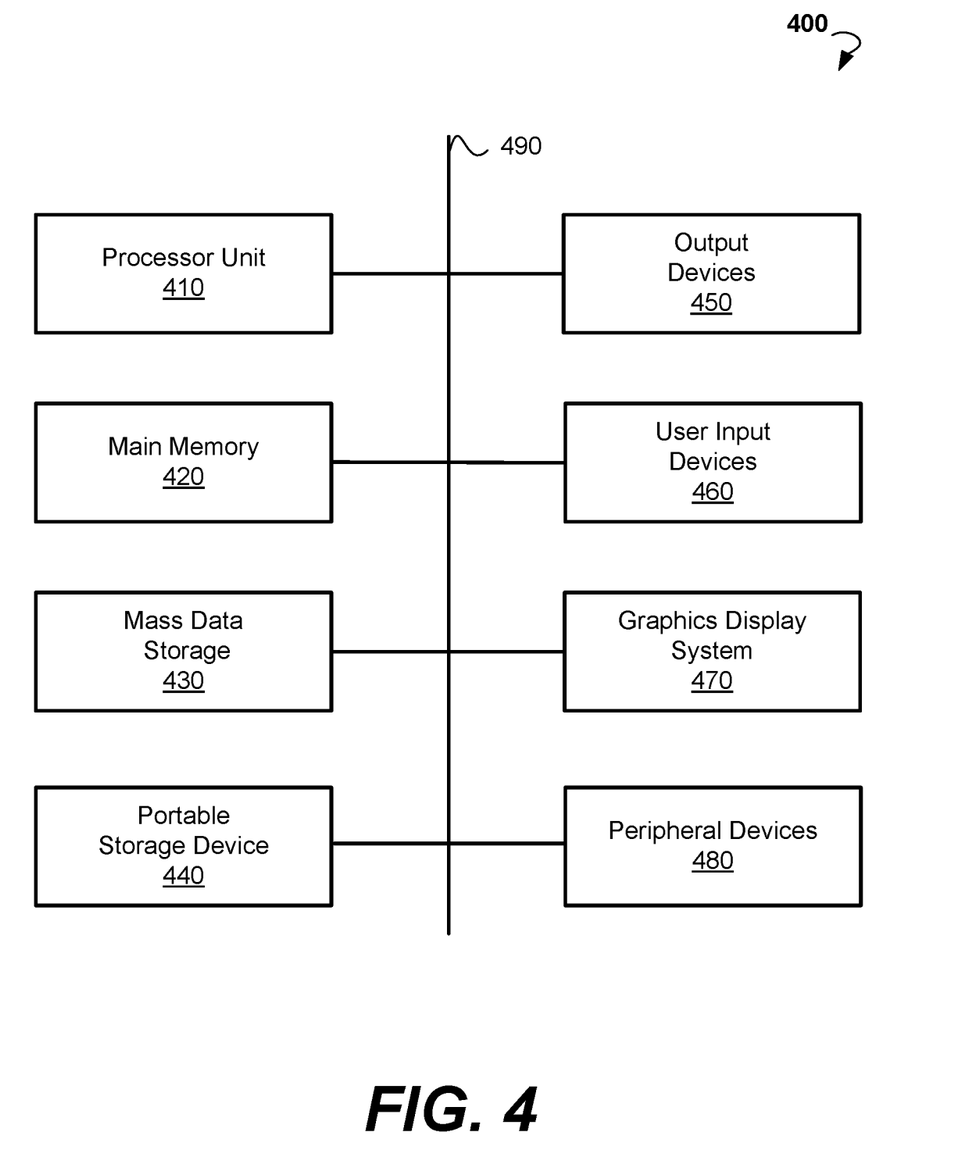
FIG. 4 is a computer system that can be used to implement some embodiments of the present disclosure.

FIG. 4 illustrates an exemplary computer system 400 that may be used to implement some embodiments of the present disclosure. The computer system 400 of FIG. 4 may be implemented in the contexts of the likes of the client(s) 110 and the server(s) 120. The computer system 400 of FIG. 4 includes one or more processor units 410 and main memory 420. Main memory 420 stores, in part, instructions and data for execution by processor units 410. Main memory 420 stores the executable code when in operation, in this example. The computer system 400 of FIG. 4 further includes a mass data storage 430, portable storage device 440, output devices 450, user input devices 460, a graphics display system 470, and peripheral devices 480.

The components shown in FIG. 4 are depicted as being connected via a single bus 490. The components may be connected through one or more data transport means. Processor unit 410 and main memory 420 is connected via a local microprocessor bus, and the mass data storage 430, peripheral device(s) 480, portable storage device 440, and graphics display system 470 are connected via one or more input/output (I/O) buses.

Mass data storage 430, which can be implemented with a magnetic disk drive, solid state drive, or an optical disk drive, is a non-volatile storage device for storing data and instructions for use by processor unit 410. Mass data storage 430 stores the system software for implementing embodiments of the present disclosure for purposes of loading that software into main memory 420.

Portable storage device 440 operates in conjunction with a portable non-volatile storage medium, such as a flash drive, floppy disk, compact disk, digital video disc, or Universal Serial Bus (USB) storage device, to input and output data and code to and from the computer system 400 of FIG. 4. The system software for implementing embodiments of the present disclosure is stored on such a portable medium and input to the computer system 400 via the portable storage device 440.

User input devices 460 can provide a portion of a user interface. User input devices 460 may include one or more microphones, an alphanumeric keypad, such as a keyboard, for inputting alphanumeric and other information, or a pointing device, such as a mouse, a trackball, stylus, or cursor direction keys. User input devices 460 can also include a touchscreen. Additionally, the computer system 400 as shown in FIG. 4 includes output devices 450. Suitable output devices 450 include speakers, printers, network interfaces, and monitors.

Graphics display system 470 include a liquid crystal display (LCD) or other suitable display device. Graphics display system 470 is configurable to receive textual and graphical information and processes the information for output to the display device.

Peripheral devices 480 may include any type of computer support device to add additional functionality to the computer system.

The components provided in the computer system 400 of FIG. 4 are those typically found in computer systems that may be suitable for use with embodiments of the present disclosure and are intended to represent a broad category of such computer components that are well known in the art. Thus, the computer system 400 of FIG. 4 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 400 is implemented as a cloud-based computing environment, such as a virtual machine operating within a computing cloud. In other embodiments, the computer system 400 may itself include a cloud-based computing environment, where the functionalities of the computer system 400 are executed in a distributed fashion. Thus, the computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 400, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for evaluating security of firmware, the method comprising:
acquiring, by at least one server, a firmware image of firmware associated with at least one computing device;
extracting, by the at least one server, at least one component of the firmware image;
analyzing, by the at least one server, the at least one component to detect at least one vulnerability of the firmware, including a presence of a password hash;
predicting, by the at least one server, a time period within which the password hash will obtain a level of weakness;
estimating, by the at least one server and based on the at least one vulnerability of the firmware, a security risk level of the firmware; and
providing, by the at least one server, a report regarding the security risk level and the at least one vulnerability of the firmware.

2. The method of claim 1, wherein the analyzing includes determining that the at least one component includes a pre-determined file.

3. The method of claim 1, wherein the analyzing includes determining that the at least one component includes at least one of a specific string or a specific pattern.

4. The method of claim 1, wherein the analyzing includes determining a presence of a private cryptographic key, public cryptographic key, or a symmetric key in the at least one component.

5. The method of claim 1, wherein the analyzing incudes:
determining that the at least one component include at least one password hash; and
determining the level of weakness of the at least one password hash.

6. The method of claim 1, wherein the extracting the at least one component is based on at least one extracting scheme, the at least one extracting scheme being selected based on one of more of the following: a type of the at least one computing device and a manufacturer of the at least one computing device.

7. The method of claim 6, wherein the extracting the at least one component is performed recursively.

8. The method of claim 1, wherein the at least one vulnerability is detected based on a database of known vulnerabilities for the firmware of the at least one computing device.

9. The method of claim 8, further comprising:
storing, by the at least one server, the at least one component;
receiving, by the at least one server, an indication that the database of known vulnerabilities has been updated with at least one further vulnerability, the at least one further vulnerability being previously unreported;
re-analyzing the at least one component to detect the at least one further vulnerability of the firmware; and in response to the detection, sending a message to at least one user of the at least one computing device associated with the firmware image.

10. The method of claim 1, wherein the analyzing includes translating the at least one component from a binary machine code into a readable text format.

11. A system for evaluating a security of firmware, the system comprising:
    at least one processor; and
    a memory communicatively coupled with the at least one processor, the memory storing instructions, which when executed by the at least processor performs a method comprising:
        acquiring a firmware image of firmware associated with at least one computing device;
        extracting at least one component of the firmware image;
        analyzing the at least one component of the firmware image to detect at least one vulnerability of the firmware, including a presence of a password hash;
        predicting a time period within which the password hash will obtain a level of weakness;
        estimating, based on the at least one vulnerability, a security risk level of the firmware; and
        providing a report regarding the security risk level and the at least one vulnerability of the firmware.

12. The system of claim 11, wherein the analyzing includes determining that the at least one component includes a pre-determined file.

13. The system of claim 11, wherein the analyzing includes determining that the at least one component includes at least one of a specific string or a specific pattern.

14. The system of claim 11, wherein the analyzing includes determining a presence of a private cryptographic key, a public cryptographic key, or a symmetric key in the at least one component.

15. The system of claim 11, wherein the analyzing incudes:
    determining that the at least one component includes at least one password hash; and
    determining the level of weakness of the at least one password hash.

16. The system of claim 11, wherein the extraction of the at least one component is based on at least one extracting scheme, the at least one extracting scheme being selected based on one of more of the following: a type of the at least one computing device and a manufacturer of the at least one computing device.

17. The system of claim 16, wherein the extraction of the at least one component is performed recursively.

18. The system of claim 11, wherein the at least one vulnerability is detected based on a database of known vulnerabilities for the firmware image of the at least one computing device.

19. The system of claim 18, further comprising:
    storing, by at least one server, the at least one component;
    receiving, by the at least one server, an indication that the database of known vulnerabilities has been updated with at least one further vulnerability, the at least one further vulnerability being previously unreported;
    re-analyzing the at least one component to detect at least one further vulnerability of the firmware; and
    in response to the detection, sending a message to at least one user of the firmware image.

20. A non-transitory computer-readable storage medium having embodied thereon instructions, which when executed by at least one processor, perform steps of a method, the method comprising:
    acquiring a firmware image of firmware associated with at least one computing device;
    extracting at least one component of a firmware image of the firmware;
    analyzing the at least one component of the firmware image to detect at least one vulnerability of the firmware, including a presence of a password hash;
    predicting a time period within which the password hash will obtain a level of weakness;
    estimating, based on the at least one vulnerability, a security risk level of the firmware; and
    providing a report regarding the security risk level and the at least one vulnerability of the firmware.

* * * * *